Aug. 5, 1958

S. I. MacDUFF 2,845,901

BACK PRESSURE PRODUCING DEVICE FOR HYDRAULIC SYSTEM

Filed Sept. 25, 1953

2 Sheets-Sheet 1

INVENTOR.
STANLEY I. MacDUFF
BY
Cecil J Arens

ATTORNEY

United States Patent Office 2,845,901
Patented Aug. 5, 1958

2,845,901

BACK PRESSURE PRODUCING DEVICE FOR HYDRAULIC SYSTEM

Stanley I. MacDuff, South Bend, Ind., assignor to Bendix Aviation Corporation, South Bend, Ind., a corporation of Delaware Application September 25, 1953, Serial No. 382,287

6 Claims. (Cl. 121—38)

This invention concerns a device to be associated with a hydraulic system for maintaining pressure in the return line at a predetermined value with respect to the pressure in the supply line.

It has been found that in many hydraulic systems, such for example as hydraulic steering systems where relatively high pressures are encountered, and extreme pressure drops occur through control equipment, etc., cavitation of the liquid results and often times undesirable noises are developed.

Therefore, it is one of the objects of this invention to provide means which will maintain a fixed ratio between inlet pressure and return pressure.

Another object of the invention resides in the provision of pressure sensitive means interconnected between the supply and discharge lines of a hydraulic system for establishing a pressure in the discharge line which bears a definite relationship to the pressure in the supply line.

A still further object of the invention resides in the provision of means interconnected between two pipe lines of a hydraulic system for creating a pressure in one of the lines which bears a definite ratio with respect to the pressure in the other line.

Figure 1:
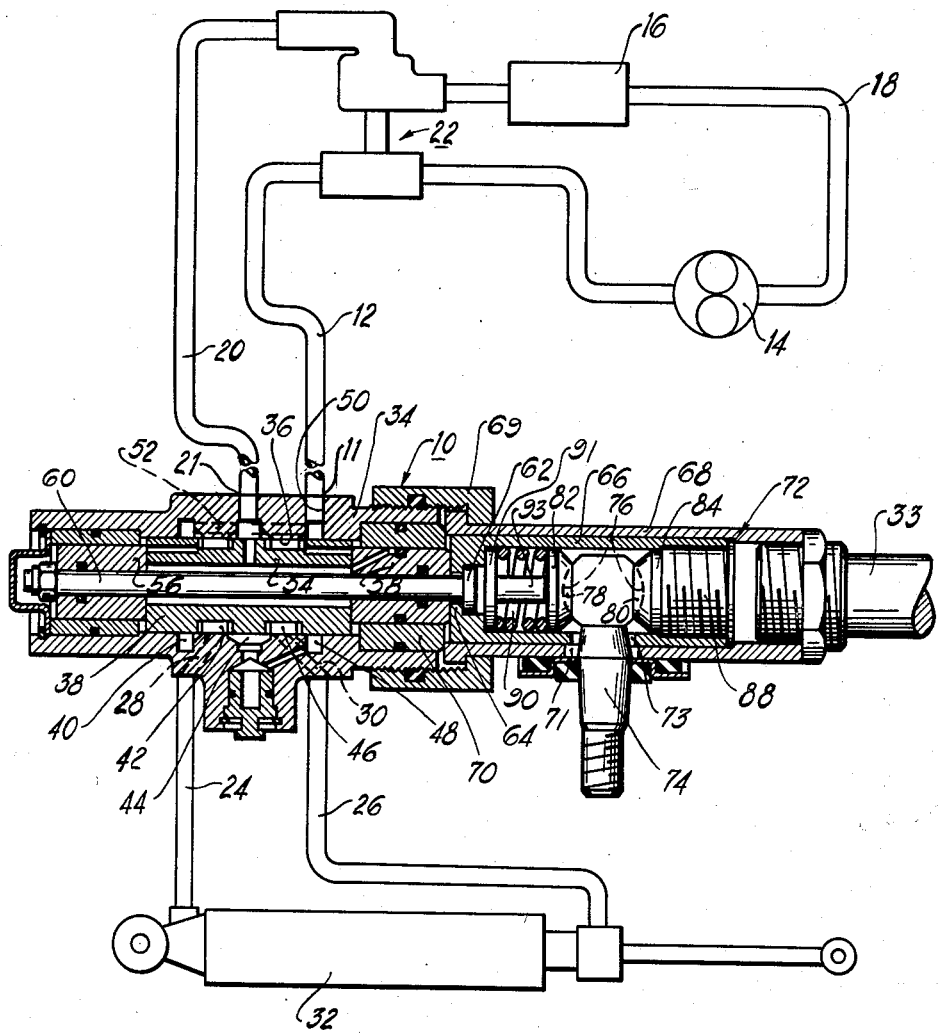
Figure 2:
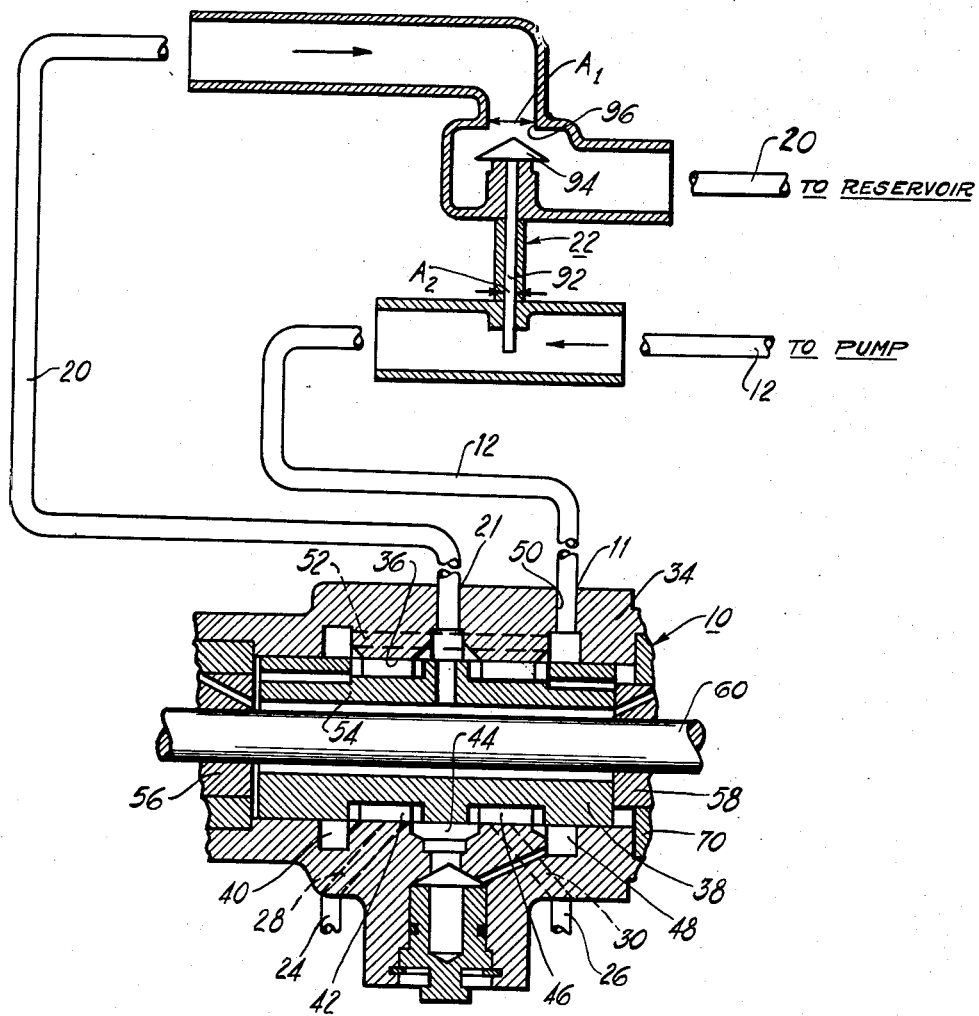

The above and other objects and features of the invention will be apparent from the following description of the apparatus taken in connection with the accompanying drawing which forms a part of this specification, and in which:

Figure 1 is a diagrammatic illustration of a hydraulic power steering system utilizing the device of the invention; and Figure 2 is a schematic view of the device of the invention associated with the control valve of Figure 1.

Referring now to Figure 1 the reference numeral 10 designates a control valve arranged in a hydraulic steering system for vehicles. An inlet port 11 of the valve is connected to a supply conduit 12 communicating with the discharge side of a pump 14 the inlet of which is connected to a reservoir 16 by a pipe line 18. A discharge or return conduit 20 connects a return port 21 of the valve 10 to the reservoir 16. The reference numeral 22 indicates the device of the invention and is interconnected with the supply and discharge conduits for a purpose to be hereinafter more fully described. Conduits 24 and 26 communicate working ports 28 and 30 respectively to opposite sides of a fluid motor 32, the latter of which is connected to steering linkage 33 of a motor vehicle.

The control valve 10 includes a housing 34, provided with a bore 36, having a valve member 38 slidably arranged therein for movement in opposite directions from a normally central position, as shown in Figure 1 for controlling flow to said fluid motor 32. The valve member 38 and cylinder bore 36 are formed with cooperating annular channels 40, 42, 44, 46, and 48. The channels 42 and 46, formed in the valve member 38, are of such width that free communication between the channel 44 and the channels 40 and 48 is established with the valve member in its central position. The channels 40 and 48 are in communication with the inlet port 11 via ducts 50 and 52. The channels 42 and 46 are connected to working ports 28 and 30 respectively, and the channel 44 is connected to the return port 21. The valve member 38 includes a midsection 54, and end sections 56 and 58 held in assembled relationship by a bolt 60. The right end of the bolt 60 is provided with an enlarged head 62 for engagement with an end 64 of a sleeve 66 slidably positioned in a tubular extension 68 of the housing 34. A coupling 69 threadedly engages the housing 34 to securely retain the tubular extension 68 in position. The sleeve 66 is permitted limited movement in the housing between the end of a bushing 70 and a shoulder 72 in the tubular extension 68. The bolt 60, ties the sections 54, 56, and 58 and the sleeve 66 together for movement as a single member or unit. The tubular extension 68 and the sleeve are provided with lateral openings 71 and 73 for the reception of a ball stud 74, one end of which is adapted to be connected to the pitman arm, not shown, of a steering gear. The other end of the ball stud is formed with a rounded portion 76 which fits in sockets, 78 and 80 of members 82 and 84 respectively, situated in the sleeve 66. A plug 88 is threaded into the open end of the sleeve 66 and is adjustable in order to preload spring 90 interposed between disk 91, which rests on the opposite end 64 of the sleeve, and the member 82. The disk is formed with an axially extending stem 93 for engagement with the member 82 to thereby provide a rigid connection with the sleeve. It will be observed that wear of the sockets and ball stud will create looseness between these parts which is taken up by the spring 90 thus avoiding rattle. The cross tie rod or steering linkage 33 threadedly engages the open end of the tubular extension 68 and is suitably linked to the steered part of the vehicle.

In many hydraulic systems where relatively high pressures are used, cavitation becomes a serious problem and can result in loss in efficiency and impairment of operation of hydraulic devices. Moreover, undesirable and objectionable noises develop as a result of fluids under pressure passing from extremely high pressure areas to very low pressure areas. In order to cope with such a problem I have developed the back pressure producing device represented by numeral 22 and best shown in Figure 2. This device comprises a pressure sensitive member 92 having one end extending into the supply conduit so as to be subjected to the inlet pressure and the other end projecting into the return conduit where said other end is acted upon by the pressure therein. A valve element 94 is carried on said one end of the member 92 for engagement with a valve seat 96 located in the return line. The valve element is self-adjusting since it is capable of fluctuating between a completely open position and a completely closed position. It may have an indeterminate number of positions during any period of time depending on the relative pressures of the supply and return conduits. The relationship of the diameter of the valve seat 96 to the diameter of the member 92 extending into the supply conduit 12 depends upon the relationship desired between the supply conduit pressure and the back pressure in conduit 20. In a specific application for steering it was determined that a ratio of $A_1$ to $A_2$, where $A_1=16$ and $A_2=1$, was satisfactory. That is, the back pressure was maintained at one-sixteenth the supply pressure. Anytime the back pressure in the return conduit 20 exceeded this value, valve element 94 would be unseated from seat 96 reducing the back pressure to a value where it was balanced against the supply pressure in a ratio of one p. s. i. to sixteen p. s. i. respectively. This particular ratio is only by way of illustration and is not to be construed as limited thereto since any ratio of areas depending upon the circumstances may be employed.

Operation and function of the system is as follows:

With the control valve in the central position shown in Figure 1, the pump forces fluid through the supply line where the fluid divides into the inlet channels 40 and 48. From the inlet channels 40 and 48 the fluid passes into the working port channels 42 and 46 from whence it flows to the return channel 44 and thence to the return conduit 20. With the member 38 of the control valve in this position there is a minimum of cavitation encountered even without the device 22 since the fluid is not required to flow through any highly restricted passages from high to low pressure.

Assume the valve member 38 is shifted to the left, see Figure 2, so that the working channel 42 is opened wider to the inlet channel 40 and return channel 44 is partially closed to working channel 42 thus restricting flow between the two latter mentioned channels. Also at this time return channel 44 is opened wider to working channel 46 and the latter channel is partially closed to the inlet channel 48. These partially closed or restricted passages formed between the channels when the valve member is moved away from its central position would create high velocity flow, which is conducive to cavitation and noise, commonly termed "hiss," were it not for the back pressure established in the return line 20 and channel 44. As noted in Figure 2 the high pressure in channel 42 tends to blow fluid at high velocities past the restriction formed between channels 42 and 44. Also the high pressure in channel 48 tends to create a high velocity flow in channel 46. These high velocity flows in the control valve 10 are controlled by the device 22 of the invention.

Although this invention has been described in connection with a certain specific embodiment, the principles are susceptible of numerous other applications that will readily occur to persons skilled in the art.

Having thus described the various features of the invention, what I claim as new and desire to secure by Letters Patent is:

1. In a hydraulic system, the combination of a supply conduit, a discharge conduit, a valve for controlling flow in the system and provided with a pressure port and a return port, said pressure and return ports being connected to said supply and discharge conduits respectively, and means interconnecting said conduits for maintaining the relative pressures therein at predetermined values, said means comprising a pressure sensitive member having one end extending into the supply conduit and the other end projecting into the return conduit, a valve element carried on said other end of the member and on which the fluid in the return conduit acts, a valve seat formed in the return conduit upstream of said valve element on which said valve element is seatable, the valve element being seated or unseated on said valve seat as a result of the relative pressures exerted against the valve element and the opposite end of the pressure sensitive member.

2. In a hydraulic system, a control valve connected to supply and discharge conduits, a back pressure producing device comprising a pressure sensitive member, a valve element carried on one end of said member, and a valve seat formed in the discharge conduit upstream of said valve element, said member having one end projecting into the supply conduit where inlet pressure acts upon it and the other end with the valve element affixed thereto projecting into the discharge conduit and seatable on said valve seat where exhaust pressure acts upon said valve element, thereby maintaining the relative pressures in the two conduits at predetermined values.

3. In a hydraulic system comprising supply and discharge conduits, a back pressure producing device comprising a pressure sensitive member extending into both the supply and discharge conduits, and a valve element carried on one end of said member for engagement with a valve seat formed upstream of said valve element in one of the conduits, said back pressure being maintained at the desired value by fixing the relationship of the diameter of the valve seat in the one conduit to the diameter of the member extending into the other conduit.

4. In a hydraulic system, the combination of a supply conduit, a discharge conduit, a work performing hydraulically actuated device connected to said conduits, a control valve for regulating flow to the device, said control valve being provided with nested body and valve members having cooperating channels and ducts, said members being relatively movable from a central relative position for controlling flow, when in said central position flow being established between said supply and discharge conduits via said channels and ducts, and valve means comprising a pressure sensitive member extending into the supply conduit and discharge conduit, and a valve element carried on one end of said pressure sensitive member, a valve seat formed in said discharge conduit upstream of said valve element to be engaged by said valve element, said valve element and pressure sensitive member reacting to the pressures exerted thereon in such a manner that a predetermined pressure ratio is maintained between the two conduits.

5. In a hydraulic system, the combination of a supply conduit, a return conduit, a control valve provided with inlet, return, and two working ports, said inlet and return ports being connected to the supply and return conduits respectively, said control valve comprising a body member with a bore therein, a valve member in the bore, said members having cooperating channels in their opposed faces connected to the respective ports, said members being relatively movable from a central relative position to control flow at said ports, when in said central position flow between said supply and return conduits being divided via said channels, and mechanism responsive to pressures in said supply and return conduits, said mechanism comprising a pressure sensitive member having one end with a valve element formed thereon projecting into the return conduit and the other end projecting into the supply conduit, and a valve seat formed in the return conduit upstream of said valve element to be engaged by said valve element, said valve element and pressure sensitive member reacting to the pressures exerted thereon, thereby maintaining a predetermined pressure ratio between the two conduits.

6. In a hydraulic system, the combination of a supply conduit, a discharge conduit, a fluid motor connected to said conduits, a control valve for regulating flow to said fluid motor, said control valve comprising a housing, a bore in said housing, a slidable valve member in said bore, annular working channels formed in said valve member, annular inlet channels and an annular return channel formed in said cylinder bore, said annular channels overlapping one another, an inlet port and return port connected to said inlet channels and return channel, working ports connected to said working channels, said slidable valve member being movable from a central position in which fluid flows from the supply conduit into the inlet channels, working port channels, return channel and thence to the discharge conduit, to a position in which one of the working channels is opened wider to one inlet channel, while the other working channel is partially closed to the other inlet channel, said return channel being partially closed to one working channel and opened wider to the other working channel thereby allowing the fluid motor to perform work, and a back pressure producing device capable of maintaining a fixed pressure ratio between said inlet and return ports thereby preventing cavitation and noise in said hydraulic system caused by the partially closed and restricted passages, said back pressure producing device comprising a pressure sensitive member extending into both the supply and discharge conduits, a valve seat formed in said discharge conduit, and a valve element downstream of said valve seat carried on one end of said member for engagement with said valve seat, the valve element being seated or unseated on said valve seat as a result of the relative pressures exerted against the valve element and the opposite end of the pressure sensitive member.

References Cited in the file of this patent

UNITED STATES PATENTS

| | | |
|---|---|---|
| 1,748,496 | Rowntree | Feb. 25, 1930 |
| 2,607,321 | Lado | Aug. 19, 1952 |
| 2,608,263 | Garrison | Aug. 26, 1952 |

FOREIGN PATENTS

| | | |
|---|---|---|
| 535,931 | Germany | Oct. 17, 1931 |